Dec. 25, 1951     H. E. MORRISON     2,579,598
CONTROL FOR AUTOMATIC WASHING MACHINES
Filed April 26, 1946     2 SHEETS—SHEET 2
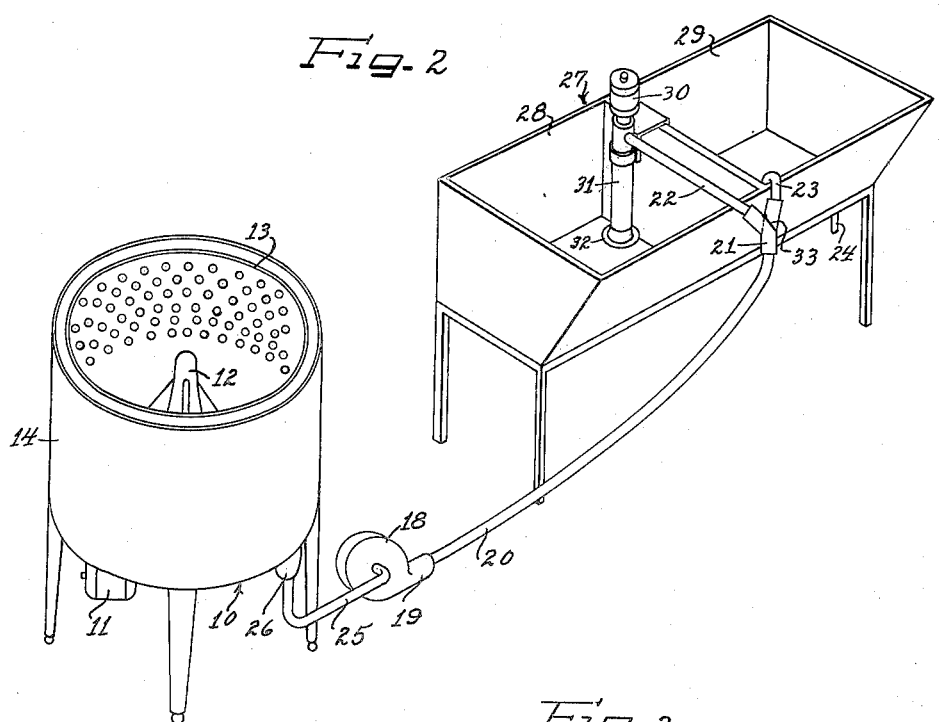
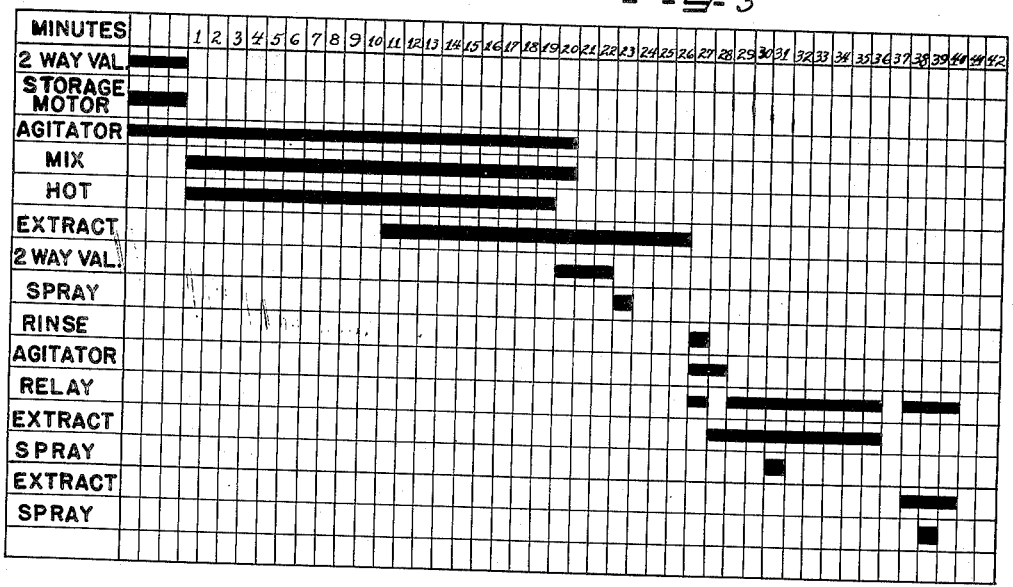
INVENTOR.
Harold E. Morrison
BY
The Firm of Charles W. Hills Patented Dec. 25, 1951

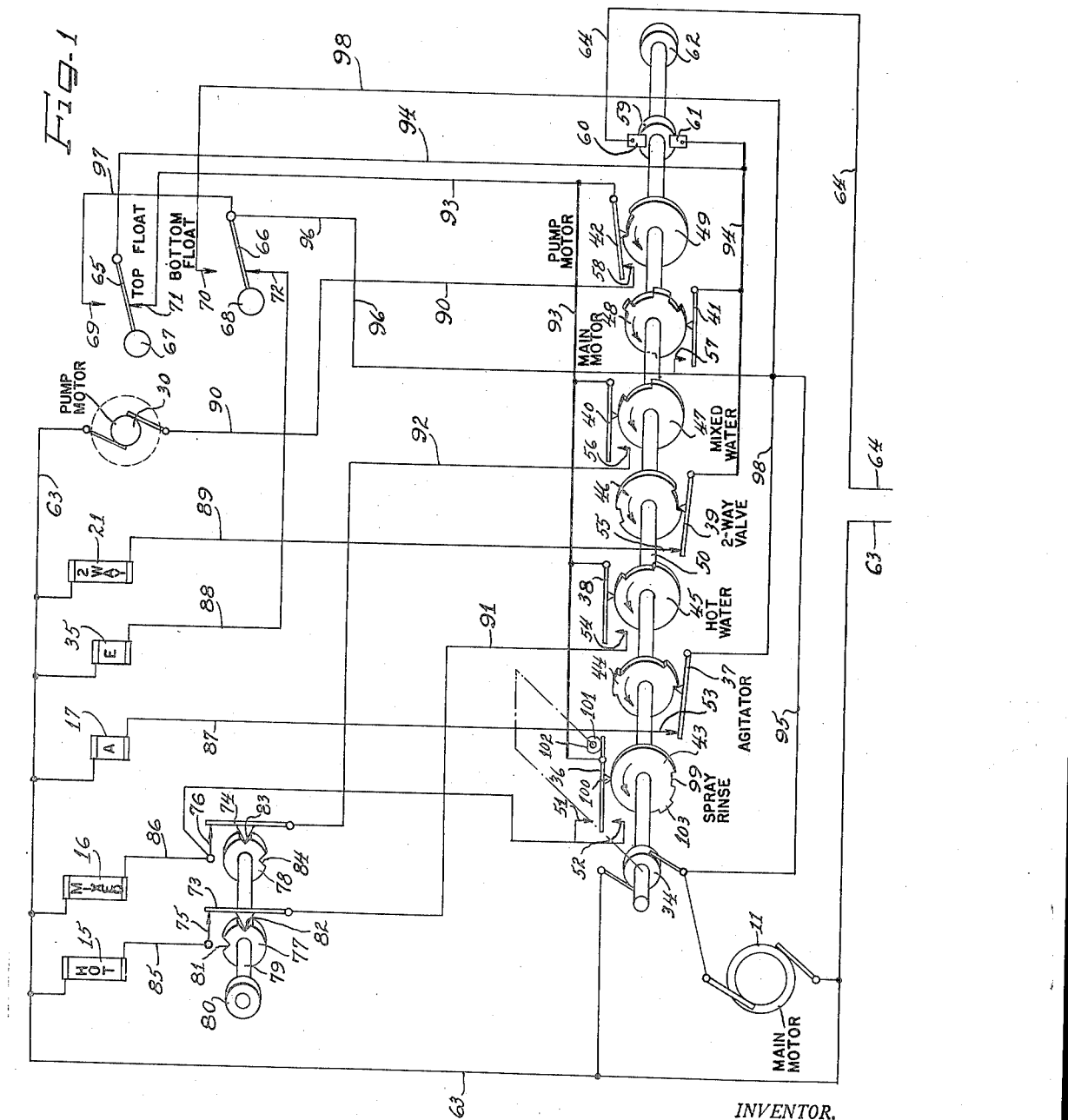

2,579,598

UNITED STATES PATENT OFFICE 2,579,598

CONTROL FOR AUTOMATIC WASHING MACHINES

Harold E. Morrison, St. Joseph, Mich., assignor to Whirlpool Corporation, a corporation of New York Application April 26, 1946, Serial No. 665,281

8 Claims. (Cl. 68—12)

This invention relates to a washing machine control circuit and more particularly to a control circuit of an automatic washing machine of the so-called household type.

One of the principal features and objects of the present invention is to provide a novel control circuit for an automatic washing machine in which a simple arrangement is provided for controlling the liquid level in the tub so that the washing machine will operate through its automatic cycle with the liquid at any of a wide variety of predetermined levels.

It is a further object of the present invention to provide an arrangement such as above referred to in which the fluid level in the tub may be controlled directly through the program timing switch simply by manually advancing the program timing switch into its next cycle of operation before the tub is completely filled with water in the ordinary manner.

Another object of the present invention is to provide a novel fluid control circuit for a laundry machine.

Still another object of the present invention is to provide a novel program timing arrangement coupled with novel means for controlling the liquid level in the tub of the machine.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawings, in which:

Figure 1 is a diagrammatic representation of a novel control circuit embodying the features and characteristics of the present inventions;

Figure 2 is a diagrammatic representation of the washing machine and storage and drain compartments; and Figure 3 is a schedule setting forth the sequential operation of the device.

The washing machine which is diagrammatically represented as embodying the novel features of the present invention includes a main washing machine motor 11 which is preferably a split phase induction motor and is of such a size as to oscillate an agitator 12 in a clothes basket 13 of the washing machine 10. Fresh water admission to the tub 14 in which the agitator 12 and the clothes basket 13 are disposed is under the control of a solenoid 15 and a solenoid 16, which when energized open valves to admit water to the tub 14 at two different predetermined elevated temperatures respectively, or a mixture thereof.

For simplicity of reference the valve solenoid 15 will be referred to as the hot water inlet control, while the solenoid 16 controls the admission of "mixed" water, which is merely hot water to which some cold water has been added to deliver it at a temperature somewhat lower than the hot water. Since the fresh water inlet per se forms no part of the present invention, it may be of any conventional form, such, for example, as that described in the Breckenridge Patent No. 2,296,266, entitled "Liquid Mixing Device," issued September 22, 1942.

The agitator 12 is arranged to be oscillated about a vertical axis and is controlled by a solenoid 17 which, when energized, mechanically connects the agitator with the drive mechanism from the main motor 11, such, for example, as in the manner described in the copending application of Peter Eduard Geldhof and Luther Ringer, No. 491,618, filed June 21, 1943, now Patent No. 2,521,159, entitled "Automatic Washing, Rinsing and Drying Machine," and assigned to the same assignee as the present invention. Thus for operation of the agitator 12 both the agitator control solenoid 17 and the main motor 11 must be energized.

The basket 13 is arranged to be rotated at a relatively high speed by the motor 11 about a vertical axis coincident with the axis of oscillation of the agitator 12. This operation is effected by energization of a solenoid 35 which connects the basket 13 with the drive mechanism from the motor 11, such, for example, as in the manner described in the copending application of Peter Eduard Geldhof and Luther Ringer, Serial No. 491,618, filed June 21, 1943, now Patent No. 2,521,159, entitled "Automatic Washing, Rinsing and Drying Machine," and assigned to the same assignee as the present invention.

The washing machine 10 is also equipped with a pump 18 which is always in open communication with the tub 14. The discharge side 19 of the pump 18 is connected to a hose 20 which leads through a two-way valve 33 and a hose 22 to a suds or storage pump 31 as well as to a discharge nozzle 23, the suds pump 31 being disposed in a storage compartment 28 and the discharge nozzle 23 being disposed over a drain compartment 29 having a drain 24 in the bottom thereof. These compartments or chambers 28 and 29 may conveniently be a set of ordinary household wash tubs 27 with the drain in the compartment 28 stopped up to form a storage compartment. This arrangement of the pump and the two-way valve is only diagrammatically illustrated, since the structural features and the arrangement per se is described and claimed in the copending application of Peter Eduard Geldhof, Luther Ringer and myself, Serial No. 630,032, filed November 21, 1945, now Patent No. 2,562,610, entitled "Self-Priming Pumping System," and assigned to the same assignee as the present invention.

Attention is called to the fact that the elevation of the two-way valve, or the elevation of the high point of the hose 22 and the nozzle 23 is such that it is higher than the maximum desired water level of the tub 14. Thus, while the intake side 25 of the pump 18 is in open communication with the sump 26 in the bottom of the tub 14, the water is not drained out, for it will only rise to a height in the hose 20 corresponding to the height in the tub 14.

The pump operation control mechanism is under the control of the agitator control solenoid 17, the pump being mechanically coupled to the main motor 11 at all times when the agitator control solenoid 17 is deenergized. This may be mechanically accomplished in any suitable manner, such, for example, as in the manner described in the copending application of Peter Eduard Geldhof and Luther Ringer, Serial No. 619,192, filed September 28, 1945, now Patent No. 2,540,724, entitled "Control Mechanism for Washing Machine," and assigned to the same assignee as the present invention. Thus, operation of the pump 18 depends upon two conditions being filled; namely, motor 11 must be running and solenoid 17 must be deenergized.

The intake 32 of the suds pump 31 is adjacent the bottom of the storage compartment 28. The suds pump 31 is driven by the motor 30 and is arranged to pump suds water back from the storage compartment 28 through the hose 22, the two-way valve 33, the hose 20 and the pump 18, to the tub 14 of the washing machine 10.

While the complete cycle of operation will be discussed in detail when the detailed operation of the cnotrol circuit of Figure 1 is described, it may be said at this time that in general the clothes are placed in the basket 13 within the tub 14 and washed therein. After the washing, the suds water is pumped by the pump 18 to the storage compartment 28, a solenoid 21 controlling the two-way valve 33 being energized so that the valve member 33 thereof places the hose connection 22 in communication with the hose 20. The basket 13 is then rotated at high speed to extract water from the clothes. The tub 14 is then filled with fresh water and the clothes are rinsed. After rinsing, the fresh water is discharged by the pump 18 through the two-way valve 21, and through the discharge nozzle 23 to the drain tub 29, the two-way valve solenoid 21 being deenergized during this stage so that the valve member 33 is in its dotted line position, as shown in Figure 2. The basket is then rotated again at high speed to extract water from the clothes. When a new batch of clothes is to be washed, the suds water, which has been stored in the storage compartment 28, is pumped back into the tub 14 by the suds pump 31 driven by the motor 30.

The above description describes the general stages of operation of the automatic washing machine without particular reference to the novel invention and features incorporated in the control circuit. These will presently be brought out in detail.

Referring now particularly to Figure 1 of the drawings, the automatic sequential operation of the washing machine 10 is under the control of a program switch unit having a plurality of cam operated switches 36 to 42, which are arranged to be actuated by a plurality of cam disks 43 to 49 respectively, all mounted on a cam shaft 50 driven by the synchronous timer motor 34. Cam switch 36 is provided with a pair of stationary contacts 51 and 52, while the remaining cam switches 37 to 42 are each provided with a single stationary contact 53 to 58 respectively.

The cam shaft 50 is also provided with a bridging contact 59 which rotates with the shaft 50 and normally rides in engagement with the two stationary contacts 60 and 61 to close an electric circuit thereacross. Bridging contact 59 opens the entire control circuit, however, when the cam shaft 50 is axially moved in a longitudinal direction by the control knob 62. The control knob 62 is also arranged to permit manual rotation of the cam shaft 50 in the same direction as the direction which the synchronous motor 34 drives the shaft 50. More particularly, this is in a counter-clockwise direction, as viewed in Figure 1 of the drawings, and as indicated by the arrows on the various cams.

Energy is supplied to the control circuit through a pair of power supply conductors 63 and 64.

In addition to the cam operated switches 36 to 42, the washing machine 10 is also provided with a pair of float operated switches 65 and 66 which are controlled by upper and lower floats 67 and 68 respectively. The upper float 67 is positioned at the normal maximum water or fluid level within the tub 14, while the float 68 is positioned at a level corresponding to the bottom of the tub 14. Float switches 65 and 66 are provided with upper contacts 69 and 70 respectively, as well as with lower contacts 71 and 72 respectively.

In addition to the float switches 65 and 66 and the cam switches 36 to 42, there is also provided a pair of temperature selection switches 73 and 74 which are associated with stationary contacts 75 and 76 respectively. These temperature selection switches 73 and 74 are actuated by cams 77 and 78 mounted on a shaft 79 and rotatable by a knob 80. The cam 77 has a pair of notches 81 and 82 therein and the cam 78 has a pair of notches 83 and 84 therein. The notches 82 and 83 of cams 77 and 78 are in line so that when the shaft 79 is in its position as shown in Figure 1 of the drawings, both switches 73 and 74 are closed. When the shaft is rotated in a clockwise direction from this position as shown in Figure 1 of the drawings through 90° the switch 73 is closed and the switch 74 is open. Similarly, when the shaft 79 is rotated 90° in a counter-clockwise direction from the position as shown in Figure 1, the switch 74 is closed and the switch 73 is open.

The electrical connections will be apparent from an inspection of Figure 1 of the drawings. One side of the solenoids 15, 16, 17 and 35, and one side of the two-way valve solenoid 21 and of the suds pump motor 30 are all connected to the supply conductor 63. The other side of the solenoids 15, 16, 17 and 35, and the other side of valve solenoid 21 and of the motor 30, are connected to stationary contacts 75, 76, 53, 72, 55 and 58 respectively through conductors 85 to 90 respectively. Switches 73 and 74 are connected to stationary contacts 54 and 56 through conductors 91 and 92 respectively. Switches 38, 38, 40 and 42 are all connected to a bus 93 which in turn is connected to the lower contact 71 of the float switch 65. Cam switches 39 and 41 and float switch 65 are connected to a bus 94, which is also connected through the bridging contact 59 to the main power supply line 64. One side of the induction motor 11 and one side of the synchronous timer motor 34 are connected to the power supply conductor 63, while the other sides of these two motors are connected together and to a conductor 95 which is connected directly to the stationary contact 57 of the cam switch 41. This same stationary contact 57 is also connected through a conductor 96 to the float switch 66. The upper contact 69 of the float switch 65 is connected through a conductor 97 to the lower float switch 66 and to the conductor 96. The upper contact 70 of the lower float switch 66 is connected through a conductor 98 to the cam switch 37.

The operation of the control circuit will be best understood by a description of a complete cycle of operation of the washing machine 11.

Let it be assumed that suds water has been stored in the compartment 28 from a previous wash cycle, and that the cam shaft 50 is in the position as shown in Figure 1 of the drawings. At this initial stage in the cycle of operation the cam switches 37, 39 and 42 are closed and all of the remaining cam switches are open. Since the tub is empty the float switches 65 and 66 are in their lower position, and it will further be assumed that the control knob 80 is in the position as shown in Figure 1 of the drawings, with the temperature selector switches 73 and 74 both closed. With the circuit in this position the suds pump motor 30 is energized through the upper float switch 65 and the cam switch 42. The two-way valve solenoid 21 is also energized through the cam switch 39. The suds pump motor 30 continues to operate until both the lower float 68 and the upper float 67 have been raised to move the float switches 65 and 66 to their upper positions in engagement with stationary contacts 69 and 70. Up to this time the timer motor 34 and the main motor 10 have been deenergized. Upon closure of the upper float switch 65 against the upper stationary contact 69, the two motors 11 and 34 are energized through the upper float switch.

If for any reason the amount of suds water in the storage compartment is not sufficient to build the fluid level up in the tub 14 to the point where the upper float switch 65 is raised, the control or timer knob 62 is advanced to the point where the cams 45 and 47 enable the cam switches 38 and 40 to close. This energizes the solenoids 15 and 16 through the cam switches 38 and 40 and through the bottom stationary contact 71 of the top float switch 65. Additional water is thus admitted to the hub 14 until the top float 67 raises to close the float switch 65 against the top stationary contact 69.

With the two floats 67 and 68 in their upper position closing the float switches 65 and 66 against their upper contacts 69 and 70 respectively the agitator control solenoid 17 is energized from the power supply conductor 64 through the bridging contact 59, conductor 94, top float switch 65, conductor 97, bottom float switch 66, conductor 98 and cam switch 37. Since the motor 11 is also energized through the top float switch 65 the agitator is placed into operation and washes the clothes or other articles to be laundered. The length of this washing cycle is adjustable, but as shown on the schedule in Figure 3, is arranged to take twenty minutes. This time is, of course, governed by the continued rotational movement of the synchronous motor 34 which is advancing the cams 43 to 49. The length of time of the washing cycle is adjustable by virtue of the fact that the entire cycle of operation of the machine commences with the initiation of the washing cycle by manually turning knob 62 into the washing cycle. Thus, the knob 62 may be turned to start the operation in a position where there is only ten minutes of the washing cycle left, or to a position where fifteen minutes is left, or to a position where the entire twenty-minute time is left, etc. At the end of the washing cycle the agitator cam switch 37 is opened and the agitator 12 is disconnected from the motor 11.

It will be remembered that it has been pointed out that the pump 18 is mechanically connected to the drive from the motor 11 whenever the agitator control solenoid 17 is deenergized. It will thus be apparent that at this stage in the cycle of operation the pump 18 starts working and pumps water through the hose 20 and into the storage compartment 28, the solenoid 21 controlling the two-way valve 33 being energized by closure of the cam switch 39 at the same time that the agitator cam switch 37 is open.

During this cycle of operation the motors 11 and 34 are energized through the cam switch 41 rather than through the float switch 65. After the bottom float switch 66 closes against the bottom stationary contact 72, the extractor control solenoid 35 is energized, thus connecting the basket 13 to the motor 11 to cause the same to be rotated at high speed. During this extracting operation the pump is in continual operation, thus pumping out any additional water which is extracted from the clothes.

During the time that the extractor is in operation it is desirable to have a spray rinse. This is obtained by the low point 99 on the cam disk 43 being positioned opposite the cam follower 100 of the cam switch 36. Although the switch 36 would normally drop into engagement with the lower contact 52 to energize the solenoid 16 and admit water into the top of the tub, it is prevented from doing so by the small cam 101. This small cam 101 is continually rotated by the timer motor 34 and only during a portion of the time that the cam follower 100 is in the slot 99 will the switch 36 be closed. This will be governed by the flat portion 102 on the rotating cam 101. This is for the purpose of only admitting water for a spray rinse for a few seconds during the time that the basket 13 is rotating at high speed.

After this first extracting operation it is then desirable to give the clothes a deep rinse. The continued rotation of the cam shaft 50 deenergizes the extractor control solenoid by opening of the cam switch 41. At this same time the high point 103 on the cam disk 43 is engaged by the cam follower 100 and moves the switch 36 into engagement with the upper contact 51. At this same time the agitator cam switch 37 is also closed. As a result fresh water is introduced into the tub 14 and when the top float switch 65 closes against the upper contact 69 the agitator 12 is placed into operation. It will be observed that during the time that the tub is filling with water the main motor 11 is not energized since the extractor cam switch 41 is open and since the top float switch 65 is still out of engagement with the top contact 69.

Upon continued rotation of the timer shaft 50 the agitator cam switch 37 is opened and the extractor cam switch 41 is closed. The motor 11 is thus energized through the cam switch 41 rather than through the top float switch 65 and water is pumped from the tub. Since the two-way valve cam switch 39 is not closed at this time the water from the deep rinse is discharged through the two-way valve over the drain compartment 29 and out through the drain 24. Upon closure of the lower float switch 66 against its bottom contact 72 the extractor solenoid 35 is energized and the basket 13 is rotated at high speed again.

Upon completion of this stage of the cycle of operation the cams are moved so that all of the cam switches are open. In this condition the control circuit is completely deenergized.

As seen in Figure 3, this would happen at the end of forty minutes. In a preferred model, the cam shaft rotates 8° per minute. Thus, at the end of forty minutes, 40° of rotation is left on each cam. To start a new cycle, the knob 62 must be rotated through 40° manually.

Let us now consider one of the principal features and advantages of the present control circuit. This advantage lies in the fact that if for any reason it is desired to wash clothes with less than the normal amount of water in the tub, this may be accomplished by manually advancing the cam shaft 50 during the time that the tub is filling with water to a point beyond the ten minute schedule as shown in the diagram in Figure 3. By cutting the extractor cam 48 in such a way that the extractor cam switch 41 closes at some intermediate point during the washing cycle, it is possible to have the agitator continue its operation even though it is not energized through the top float. More particularly, it will be observed that the conductor 95 is connected with a conductor 98 so that power for the agitator is thus obtained through the extractor cam and the contact 57 of the switch 41 rather than through the top float switch. It will thus be apparent that a person operating the machine need only watch the water as it is rising in the tub and when it has reached the desired level to quickly turn the control knob 62 to a point beyond the ten minute point in the washing cycle. Thus anything less than ten minutes may be obtained for a washing cycle. The ten minute point has been arbitrarily chosen and any other point may of course be selected if desired. It has been found, however, that it is undesirable to have a long washing cycle with less than the normal full tub of water. The advancing of the cam shaft 50 by this manual operation of course interrupts the further introduction of water into the tub either from the suds pump motor 30 or from the hot and mixed water admission valves 15 and 16 since their associated cam switches 42, 38 and 40 respectively, are open. By obtaining power for the agitator through the extractor cam during the later portion of the washing stage, the necessity of providing a separate and additional relay which operates in parallel with the top float switch is eliminated. This simplified control arrangement also eliminates the addition of an extra control knob or pushbutton on the washing machine. This, of course, is a highly desirable feature from the standpoint of the public, who dislike a large number of control knobs or switches for any household appliance. Copending application Serial No. 665,280 discloses subject matter related to that herein disclosed.

While I have shown a particular embodiment of my invention, it will, of course, be understood that I do not wish to be limited thereto, since many modifications may be made and I therefore contemplate, by the appended claims, to cover all such modifications as fall within the true spirit and scope of my invention.

I claim as my invention:

1. In an automatic washing machine, the combination comprising a tub, means for delivering fluid to said tub including a pump, a motor for driving said pump, and a float switch having a lower contact connected to energize said motor and effect operation of said pump, a second motor for carrying out certain stages of the washing cycle, said float switch having an upper contact connected to energize said second motor when said switch is in an uppermost position, a program switch unit including a plurality of stationary and movable contacts, and circuit means connected thereto to carry the washing machine through a cycle of operations and to energize said pump motor to operate said pump and deliver fluid to the tub under control of said lower contact of said float switch, and a circuit from said program switch to said second motor independent of the circuit from said float switch to said second motor and connecting said second motor in the circuit regardless of the level of the fluid in the tub upon the advance of said program switch into a washing cycle.

2. In an automatic washing machine, the combination comprising a tub, means for delivering fluid to said tub including a pump and a float switch having a lower contact controlling operation of said pump and an upper contact controlling the instigation of certain other operations of the washing cycle, a motor carrying out certain operations of the washing cycle, a program switch unit including movable contact means and circuit means connected therewith for carrying the washing machine through a cycle of operations including a fluid delivery stage effected by operation of said pump, whose length is controlled by said float switch and is a function only of the fluid level in the tub, a timer motor driving said program switch and a circuit from said upper contact of said float switch to said timer motor and said main motor energizing said motors through said float switch when said switch is in engagement with its upper contact, and a circuit from said program switch to said main motor and said timer motor independent of said float switch, energizing said motors through said program switch regardless of the fluid level in the tub and the position of said float switch, upon the manual advance of said program switch to a position beyond the fluid delivery stage.

3. In an automatic washing machine, the combination comprising a tub, electrically operated fluid delivery means, delivering fluid to fill said tub, a main motor carrying out certain stages of the washing cycle, an energizing circuit for said fluid delivery means and main motor including a program switch unit including a timer motor and movable contacts operated thereby for connecting said fluid delivery means and said main motor in the circuit to carry the washing machine through a cycle of operations including a fluid delivery stage whose length of operation normally is a function only of the fluid level in the tub, a float switch connected in said circuit and having a lower contact normally connecting said fluid delivery means in the circuit through certain contacts of said program switch and having an upper contact connecting said main motor in the circuit independently of said program switch, and energizing connections from certain other of the contacts of said program switch to said main motor and said timer motor, energizing said motors when said program switch has been advanced beyond a filling stage into a washing stage and connecting said motors in the circuit regardless of the fluid level in the tub.

4. In an automatic washing machine of the type having an agitator and an agitator control and an extractor and an extractor control, a control circuit therefor comprising a timer motor and a plurality of timer operated cam switches for sequentially carrying said washing machine through a cycle of operation, an upper fluid level float controlled switch, said cam switches including an agitator cam operated control switch and an extractor cam operated control switch and circuit means for energizing the agitator control either through said float controlled switch and said agitator cam switch or through said extractor cam switch and said agitator cam switch.

5. In an automatic washing machine of the type having an agitator and an agitator control and an extractor and an extractor control, a control circuit therefor comprising a timer motor, a time shaft driven by said timer motor, a plurality of cams on said shaft, a plurality of switches operated by said cams for sequentially carrying said washing machine through a cycle of operation, an upper fluid level float controlled switch, said cam switches including an agitator cam operated control switch and an extractor cam operated control switch, circuit connections energizing said agitator control for a first predetermined period through said float controlled switch and said agitator cam switch and then for a second predetermined period through said extractor cam switch and said agitator cam switch.

6. In an automatic washing machine of the type having an agitator and an agitator control and an extractor and an extractor control, a control circuit therefor comprising a timer motor, a time shaft driven by said timer motor, a plurality of cams on said shaft, a plurality of switches operated by said cams for sequentially carrying said washing machine through a cycle of operation, an upper fluid level float controlled switch, said cam switches including an agitator cam operated control switch and an extractor cam operated control switch, circuit connections for energizing said agitator control for a first predetermined period through said float controlled switch and said agitator cam switch and then for a second predetermined period through said extractor cam switch and said agitator cam switch, and manual means for advancing said cam shaft to start the operation of said agitator in said second predetermined period.

7. In an automatic washing machine of the type having a tub, an extractor basket within said tub, an agitator within said basket, solenoid control valve means for admitting fluid into said tub, a float defining a maximum fluid level within said tub, a two-position switch operated by said float and having upper and lower stationary contacts, a motor for oscillating said agitator and for rotating said extractor basket, solenoid controls for connecting said agitator and said extractor basket to said motor, the improvement which comprises a control circuit therefor comprising a pair of power supply conductors, a rotatable cam shaft, a substantially constant speed motor driving said cam shaft, a plurality of cams on said shaft, circuit means having a plurality of switches therein operated by said cams including a fluid admission cam switch, an agitator cam switch and an extractor cam switch, said valve solenoid being connected by the operation of said cam shaft to said power supply conductors through the lower stationary contacts of said float switch and said fluid admission cam switch for a first predetermined period of time, said agitator control being connected to said power supply conductors through the upper stationary contact of said float controlled switch and said agitator cam switch during a second predetermined period of time, and then through said extractor cam switch and said agitator cam switch during a third predetermined period of time.

8. In an automatic washing machine of the type having a tub, an extractor basket within said tub, an agitator within said basket, solenoid control valve means for admitting fluid into said tub, a float defining a maximum fluid level within said tub, a two-position switch operated by said float and having upper and lower stationary contacts, a motor for oscillating said agitator and for rotating said extractor basket, solenoid controls for connecting said agitator and said extractor basket to said motor, the improvement which comprises a control circuit therefor comprising a pair of power supply conductors, a rotatable cam shaft, a substantially constant speed motor driving said cam shaft, a plurality of cams on said shaft, circuit means having a plurality of switches therein operated by said cams including a fluid admission cam switch, an agitator cam switch and an extractor cam switch, said valve solenoid being connected by the operation of said cam shaft to said power supply conductors through the lower stationary contacts of said float switch and said fluid admission cam switch for a first predetermined period of time, said agitator control being connected to said power supply conductors through the upper stationary contact of said float controlled switch and said agitator cam switch during a second predetermined period of time, and then through said extractor cam switch and said agitator cam switch during a third predetermined period of time, and manual means for advancing said cam shaft at any time during said first predetermined period of time into said third predetermined period of time, whereby the fluid level in the tub may be manually selected when desired.

HAROLD E. MORRISON.

REFERENCES CITED

The following references are of record in the file of this patent:

UNITED STATES PATENTS

| Number | Name | Date |
|---|---|---|
| 1,382,735 | McAuley et al. | June 28, 1921 |
| 2,225,407 | Bassett | Dec. 17, 1940 |
| 2,265,516 | Chayle | Dec. 9, 1941 |
| 2,280,574 | Forse | Apr. 21, 1942 |
| 2,391,561 | Geldhof et al. | Dec. 25, 1945 |